US012608484B2

(12) United States Patent
Theismann et al.

(10) Patent No.: US 12,608,484 B2
(45) Date of Patent: \*Apr. 21, 2026

(54) SYSTEMS AND METHODS FOR TRANSLATING DIFFERENT VULNERABILITY SCAN RESULTS INTO A STANDARDIZED FORMAT AND FOR CERTIFYING TARGET RESOURCES AGAINST DETECTION OF VULNERABILITIES

(71) Applicant: Capital One Services, LLC, McLean, VA (US)

(72) Inventors: Andrew Theismann, Saint Petersburg, FL (US); Tanner Rideout, Garland, TX (US); Chuan Wang, Vienna, VA (US); Matthew Kern, Arlington, VA (US); Allen Qiu, Arlington, VA (US); Thomas Edward Dean, Middletown, DE (US); Mitchell Holmes, Arlington, TX (US)

(73) Assignee: Capital One Services, LLC, McLean, VA (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/394,690

(22) Filed: Dec. 22, 2023

(65) Prior Publication Data

US 2025/0209178 A1     Jun. 26, 2025

(51) Int. Cl.
| | |
|---|---|
| *G06F 21/57* | (2013.01) |
| *G06F 9/54* | (2006.01) |
| *G06F 11/30* | (2006.01) |

(52) U.S. Cl.
CPC ............ *G06F 21/577* (2013.01); *G06F 9/541* (2013.01); *G06F 11/3006* (2013.01)

(58) Field of Classification Search
CPC ..... G06F 21/577; G06F 9/541; G06F 11/3006
See application file for complete search history.

(56) References Cited

U.S. PATENT DOCUMENTS

| | | |
|---|---|---|
| 8,938,799 B2 | 1/2015 | Kuo |
| 9,990,635 B2 | 6/2018 | Tuchman et al. |

(Continued)

FOREIGN PATENT DOCUMENTS

WO     2008014507 A2     1/2008

*Primary Examiner* — Anh Nguyen
(74) *Attorney, Agent, or Firm* — Bookoff McAndrews, PLLC

(57) ABSTRACT

A computer-implemented method includes: receiving a request to scan a resource for detection of a vulnerability, the resource comprising one or more of: a component of an application, a code-base of the application, or a third-party library associated with the application; determining one or more matching vulnerability scanning operators among a plurality of vulnerability scanning operators based at least in part on one or more properties associated with the request; transmitting the request to the one or more matching vulnerability scanning operators, the one or more matching vulnerability scanning operators having access to the resource; receiving an initial result associated with the request from the one or more matching vulnerability scanning operators; obtaining a predetermined format for the initial result; generating a translated result by modifying the initial result based on the predetermined format; and transmitting the translated result to a source of the request.

16 Claims, 6 Drawing Sheets

(56) References Cited

U.S. PATENT DOCUMENTS

| | | | |
|---|---|---|---|
| 10,360,025 B2 | 7/2019 | Foskett et al. | |
| 10,817,611 B1 | 10/2020 | Glynn et al. | |
| 11,277,431 B2 | 3/2022 | Trivellato et al. | |
| 11,822,672 B1 * | 11/2023 | Kravtsov | G06F 21/577 |
| 12,314,401 B1 * | 5/2025 | Matear | G06F 21/577 |
| 2010/0100930 A1 | 4/2010 | King | |
| 2012/0304300 A1 | 11/2012 | LaBumbard | |
| 2020/0082094 A1 * | 3/2020 | Mcallister | G06F 8/77 |

* cited by examiner

100

SYSTEMS AND METHODS FOR TRANSLATING DIFFERENT VULNERABILITY SCAN RESULTS INTO A STANDARDIZED FORMAT AND FOR CERTIFYING TARGET RESOURCES AGAINST DETECTION OF VULNERABILITIES

TECHNICAL FIELD

Various embodiments of the present disclosure relate generally to systems and methods for translating different vulnerability scan results into a standardized format and, more particularly, to systems and methods for certifying application resources or machine images based on receipt of associated scan requests.

BACKGROUND

Product security in a business setting may encompass various aspects of security pertaining to a business application or a service. For example, product security may focus on security in each phase of a software development life cycle. Product security may encompass network security and infrastructure security, which can include application security and data security related to the overall infrastructure. As such, scanning a product related resource for compliance and/or vulnerabilities requires reciprocal data flow with scanning operators, which, if not managed properly, may create unwanted inefficiencies and delays with obtaining scanning results.

Further, different scanning operators may require that scan requests be submitted using operator specified communication protocols. Scan results may also be transmitted in communication formats default to a specific operator, which may increase unwanted inefficiencies and delays with obtaining scanning results.

The present disclosure is directed to overcoming one or more of these above-referenced challenges.

SUMMARY OF THE DISCLOSURE

In some aspects, the techniques described herein relate to a computer-implemented method, including: receiving, via one or more processors, a request to scan a resource for detection of a vulnerability, the resource including one or more of: a component of an application, a code-base of the application, or a third-party library associated with the application; determining, via the one or more processors, one or more matching vulnerability scanning operators among a plurality of vulnerability scanning operators based at least in part on one or more properties associated with the request; transmitting, via the one or more processors, the request to the one or more matching vulnerability scanning operators, the one or more matching vulnerability scanning operators having access to the resource; receiving, via the one or more processors, an initial result associated with the request from the one or more matching vulnerability scanning operators; obtaining, via the one or more processors, a predetermined format for the initial result; generating, via the one or more processors, a translated result by modifying the initial result based on the predetermined format; and transmitting, via the one or more processors, the translated result to a source of the request.

In some aspects, the techniques described herein relate to a computer-implemented method, wherein the initial result includes: a first individual result from a first matching vulnerability scanning operator of the one or more matching vulnerability scanning operators; and a second individual result from a second matching vulnerability scanning operator of the one or more matching vulnerability scanning operators.

In some aspects, the techniques described herein relate to a computer-implemented method, wherein the first individual result is in a first operator format and the second individual result is in a second operator format, the first operator format and the second operator format being different, such that the translated result standardizes the first individual result and the second individual result into the predetermined format.

In some aspects, the techniques described herein relate to a computer-implemented method, wherein the one or more properties include: a selection of one or more of static application security testing (SAST), dynamic application security testing (DAST), software composition analysis (SCA), infrastructure scanning, application programming interface (API) scanning, infrastructure as code (IAC) scanning, or container scanning.

In some aspects, the techniques described herein relate to a computer-implemented method, wherein the one or more processors are components of a virtual machine instance operating in a cloud computing environment.

In some aspects, the techniques described herein relate to a computer-implemented method, further including, prior to transmitting the request to the one or more matching vulnerability scanning operators and after determining the one or more matching vulnerability scanning operators: determining, via the one or more processors, a respective operator specified communication protocol for each of the one or more matching vulnerability scanning operators; and wherein transmitting the request to each of the one or more matching vulnerability scanning operators includes transmitting the request via the respective operator specified communication protocol.

In some aspects, the techniques described herein relate to a computer-implemented method, wherein transmitting the translated result to the source of the request includes: using an application programming interface (API) as a component of a serverless compute in a cloud computing environment.

In some aspects, the techniques described herein relate to a computer-implemented method, wherein the API includes: a representational state transfer (REST) API.

In some aspects, the techniques described herein relate to a computer-implemented method, wherein the predetermined format includes one or more of: a JSON format, a CSV format, or a XML format.

In some aspects, the techniques described herein relate to a computer-implemented method, wherein the initial result and the translated result are stored in a serverless data store in a cloud computing environment.

In some aspects, the techniques described herein relate to a computer-implemented method, further including: receiving, via the one or more processors, a query for a status update of the request from the source of the request; and transmitting, via the one or more processors, a response to the query to the source of the request.

In some aspects, the techniques described herein relate to a non-transitory computer-readable medium containing instructions that, when executed by a processor, cause the processor to perform a method including: receiving a request to scan a resource for detection of a vulnerability, the resource including one or more of: a component of an application, a code-base of the application, or a third-party library associated with the application; determining one or more matching vulnerability scanning operators among a plurality of vulnerability scanning operators based at least in part on one or more properties associated with the request; transmitting the request to the one or more matching vulnerability scanning operators, the one or more matching vulnerability scanning operators having access to the resource; receiving an initial result associated with the request from the one or more matching vulnerability scanning operators; obtaining a predetermined format for the initial result; generating a translated result by modifying the initial result based on the predetermined format; and transmitting the translated result to a source of the request.

In some aspects, the techniques described herein relate to a non-transitory computer-readable medium, wherein the initial result includes: a first individual result from a first matching vulnerability scanning operator of the one or more matching vulnerability scanning operators; and a second individual result from a second matching vulnerability scanning operator of the one or more matching vulnerability scanning operators.

In some aspects, the techniques described herein relate to a non-transitory computer-readable medium, wherein the first individual result is in a first operator format and the second individual result is in a second operator format, the first operator format and the second operator format being different, such that the translated result standardizes the first individual result and the second individual result into the predetermined format.

In some aspects, the techniques described herein relate to a non-transitory computer-readable medium, wherein the one or more properties include: a selection of one or more of static application security testing (SAST), dynamic application security testing (DAST), software composition analysis (SCA), infrastructure scanning, application programming interface (API) scanning, infrastructure as code (IAC) scanning, or container scanning.

In some aspects, the techniques described herein relate to a non-transitory computer-readable medium, the method further including, prior to transmitting the request to the one or more matching vulnerability scanning operators and after determining the one or more matching vulnerability scanning operators: determining a respective operator specified communication protocol for each of the one or more matching vulnerability scanning operators; and wherein transmitting the request to each of the one or more matching vulnerability scanning operators includes transmitting the request via the respective operator specified communication protocol.

In some aspects, the techniques described herein relate to a non-transitory computer-readable medium, wherein transmitting the translated result to the source of the request includes: using an application programming interface (API) as a component of a serverless compute in a cloud computing environment.

In some aspects, the techniques described herein relate to a non-transitory computer-readable medium, wherein the initial result and the translated result are stored in a serverless data store in a cloud computing environment.

In some aspects, the techniques described herein relate to a non-transitory computer-readable medium, the method further including: receiving a query for a status update of the request from the source of the request; and transmitting a response to the query to the source of the request.

In some aspects, the techniques described herein relate to a computer-implemented method, including: receiving, via one or more processors, a request to scan a resource for detection of a vulnerability, the resource including one or more of: a component of an application, a code-base of the application, or a third-party library associated with the application; determining, via the one or more processors, one or more matching vulnerability scanning operators among a plurality of vulnerability scanning operators based at least in part on one or more properties associated with the request; determining, via the one or more processors, a respective operator specified communication protocol for each of the one or more matching vulnerability scanning operators; transmitting, via the one or more processors, the request to the one or more matching vulnerability scanning operators, the one or more matching vulnerability scanning operators having access to the resource, wherein transmitting the request to each of the one or more matching vulnerability scanning operators includes transmitting the request via the respective operator specified communication protocol; receiving, via the one or more processors, an initial result associated with the request from the one or more matching vulnerability scanning operators, the initial result including: a first individual result from a first matching vulnerability scanning operator of the one or more matching vulnerability scanning operators; and a second individual result from a second matching vulnerability scanning operator of the one or more matching vulnerability scanning operators, wherein the first individual result is in a first operator format and the second individual result is in a second operator format, the first operator format and the second operator format being different; obtaining, via the one or more processors, a predetermined format for the initial result; generating, via the one or more processors, a translated result by modifying the initial result based on the predetermined format; and transmitting, via the one or more processors, the translated result to a source of the request.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
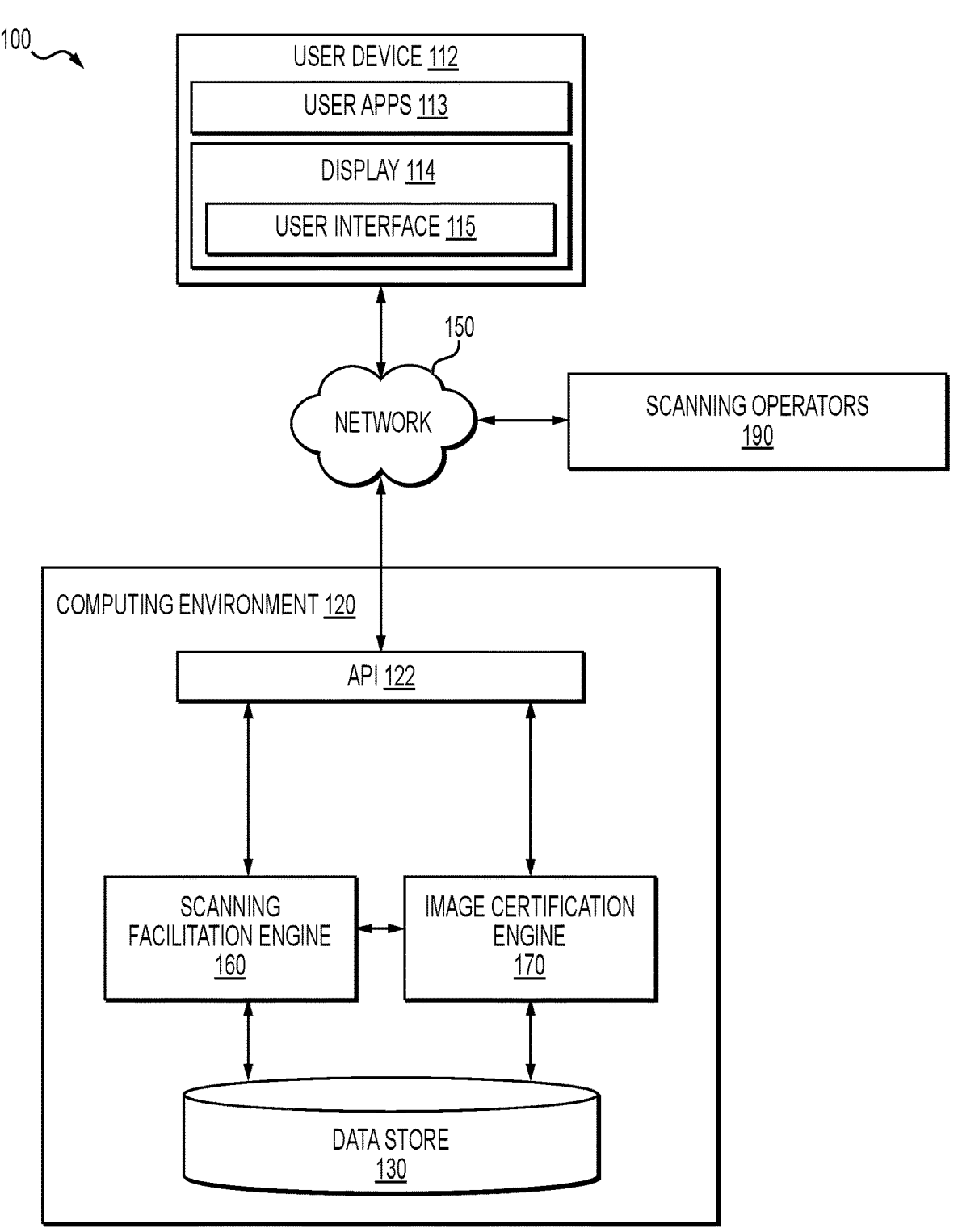
FIG. 1 depicts an exemplary system infrastructure for translating different vulnerability scan results into a standardized format, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of +10% of a stated or understood value.

As discussed above, product security may encompass various aspects of security pertaining to a business application or a service. Product security may focus on security in each phase of a software development life cycle. Infrastructure security may be a subset of product security and may focus on the integrity and security of the underlying infrastructure of a running application or a service. Application security may also be a subset of product security and may focus on protecting respective application data in a specific context. For example, application security features may include input validation, authentication, authorization, encryption, logging, and application security testing.

Security testing may include, among others, static application security testing (SAST) for detection of vulnerabilities by reviewing the source code (e.g., code-base) of an application, dynamic application security testing (DAST) for detection of vulnerabilities present in the application and infrastructure when the application is running, software composition analysis (SCA) focusing on third party (e.g., third-party libraries) and open source vulnerabilities, infrastructure as code (IAC) scanning, and container scanning. Business applications or operators, such as WhiteSource, Qualys® Aqua, Detectify, Whitehat, DataTheorem, among others, may be used to perform the above-mentioned vulnerability and/or compliance scans. While having a resource scanned with a single operator may not cause business or operation-associated issues, having a resource scanned with multiple operators may create such issues.

For example, an operator may not have an exposed API and may require that all scan requests be manually approved using JIRA tickets, and may return a response in XML format. In another example, another operator may have an exposed API but may return a response in JSON format. In another example, another operator may have an exposed API but may not return any response. In the above-mentioned cases, developers may need to understand each operator's way of processing requests, look out for different scenarios coming from each operator, and handle errors in separate ways for each operator, etc. This may lead to a complicated code base and may increase financial burden for a corporation if the team needs to switch between operators.

In addition to the problems discussed above, other issues may arise in a business setting when a user desires to release into production a machine image, e.g., an Amazon®

Machine Image (AMI), or a container image, e.g., a Docker® image. To release a machine image or a container image into production, the machine image or the container image may need to be certified by an appropriate entity or team. However, some certification processes for machine or container images may be heavily manual or nonexistent, which can create further business or operation-associated issues.

In addition, a certification team within an enterprise tasked with certifying machine or container images using manual certification processes may create bottlenecks, where results of the certification requests may not be returned in a timely fashion. For example, bottlenecks may arise when the volume of requests is higher than normal and/or if the nature of the requests deviates from a standard request that the certification team is used to handling.

In the context outlined above, one or more embodiments described herein may integrate an automated process for scanning one or more resources including various applications, machine and/or container images, and infrastructure components supporting thereof based on one or more received requests. The automated process may include execution of a scanning distribution platform that provides users with a common interface to initiate various kinds of ad-hoc scans for a range of resources and gain visibility into the status of different types of scans. One or more embodiments may support infrastructure and container image scans using scanning platforms or operators, such as the ones discussed above. One or more embodiments may translate a received scan request to a format or syntax that operators (e.g., using operator specified communication protocols) understand and may route it to the operators. After the request is processed, the results may be translated again into a developer friendly format and transmitted back to a source of the request. In addition, one or more embodiments may provide an API to initiate scan requests.

One or more embodiments may integrate an automated process for machine image and/or container image certification. The automated process may engage in a cyber approval process for machine images (e.g., AMIs) and/or container images based on receipt of valid requests. Once certification requests are received, one or more embodiments may facilitate initiation of compliance scans and/or vulnerability scans of machine and/or container images. Scans may be performed by third party operators such as WhiteSource, Qualys®, Aqua, Detectify, Whitehat, DataTheorem, among others, as discussed above. Once scan results are received from one or more of the operators above, one or more embodiments may initiate an internal algorithm to determine the validity of the scan results. One or more embodiments may include a web and/or API layer to integrate into any manual or automated processes that may be followed in an enterprise setting.

One or more embodiments may be used for gathering scan outputs/results after receiving a scan request and transmitting the outputs/results back to a source of the request. One or more embodiments may enable image creating entities to create a new server based on a machine image that is submitted for certification. One or more embodiments may initiate a scan request upon receiving an IP address of a new server for current vulnerabilities and configuration compliance results. Upon completion of those scans and receiving the scan results, an automated evaluation of the results may be conducted. A record of the evaluation results may be stored in a data store and the evaluation results may be sent to a source of the request as either a pass or a fail for integration into image creation pipelines along with available options for result artifacts to be retained. Result artifacts may include response text in one or more of standard out, JSON format, CSV format, or XML format.

One or more embodiments may automatically distribute one or more scan requests to one or more matching scanning operators using operator specified communication protocols. Upon receiving one or more scan results associated with the one or more scan requests in a default communication format specified by the one or more scanning operators, one or more embodiments may automatically translate the one or more scan results to a communication format specified by a user, and transmit the translated scan results back to the user. In this manner, results in different operator formats may be translated into a standardized format.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to develop and execute a complicated code base for satisfying different communication protocol requirements various scanning operators may require for initiating scans (e.g., vulnerability scans and/or compliance scans, etc.) of a range of resources and/or distributing scan results; (2) additionally reducing computer resource utilization by executing an automated certification process upon receiving one or more requests to certify a machine image, a container image, or infrastructure components supporting thereof; (3) improving the user experience in interacting with a computer system by providing a common interface to initiate various kinds of scans for a range of resources (e.g., one or more applications, one or more application components, one or more machine images, one or more container images, or one or more infrastructure components supporting thereof, etc.), monitor progress of pending scans for the range of resources, and receive scan results once scans are completed; (4) improving the functioning of the computing system through a more streamlined communication interface that translates different scan results into a standardized format desired by a user; and so forth. In the following discussion, a general description of the system and its components is provided, followed by a discussion of the operation of the same.

Referring now to the appended drawings, FIG. 1 depicts an exemplary system infrastructure for translating different vulnerability scan results into a standardized format, according to one or more embodiments. The system 100 may include a user device 112, a computing environment 120, and one or more scanning operators 190, which are in data communication with each other via a network 150. The network 150 includes, for example, the Internet, intranets, extranets, wide area networks (WANs), local area networks (LANs), wired networks, wireless networks, cable networks, satellite networks, or other suitable networks, etc., or any combination of two or more such networks.

The scanning operators 190 are representative of one or more scanning operators, such as WhiteSource, Qualys®, Aqua, Detectify, Whitehat, and DataTheorem, among others that may be suited to perform vulnerability scans and/or compliance scans for security testing of a range of resources. For example, vulnerability scanning for security testing may include static application security testing (SAST) for detection of vulnerabilities by reviewing the source code of an application, dynamic application security testing (DAST) for detection of vulnerabilities present in the application and infrastructure when the application is running, software composition analysis (SCA) focusing on third party and open source vulnerabilities, and infrastructure and image scans for detection of vulnerabilities and compliance violations present in machine images and container images, among others.

The computing environment 120 may include, for example, a server computer or any other system providing computing capability. Alternatively, the computing environment 120 may employ a plurality of computing devices that may be arranged, for example, in one or more server banks or computer banks or other arrangements. Such computing devices may be located in a single installation or may be distributed among many different geographical locations. For example, the computing environment 120 may include a plurality of computing devices that together may comprise a hosted computing resource, a grid computing resource, and/or any other distributed computing arrangement. In some cases, the computing environment 120 may correspond to an elastic computing resource where the allotted capacity of processing, network, storage, or other computing-related resources may vary over time. The computing environment 120 may further include a scalable cloud computing environment or platform with scalable resources for computations and/or data storage.

Various applications and/or other functionality may be executed in the computing environment 120 according to one or more embodiments. Also, various data may be stored in a data store 130 that is accessible to the computing environment 120. The data store 130 may be representative of a plurality of data stores 130 as can be appreciated. The data store 130 may include cloud-based serverless data stores. The data stored in the data store 130, for example, is associated with the operation of the various applications and/or functional entities described below.

The components executed in the computing environment 120, for example, include a scanning facilitation engine 160, an image certification engine 170, and other applications, services, processes, systems, engines, or functionality not discussed in detail herein.

The scanning facilitation engine 160 is executed for distribution of scan requests, translation of scan results, and distribution of translated scan results, all of which are associated with security testing of various applications, machine images, and/or container images. Scan requests may include vulnerability scan requests and/or compliance scan requests initiated by a user of the user device 112. For distribution of scan requests, the scanning facilitation engine 160 may automatically route the above-mentioned scan requests to one or more matching scanning operators 190 using operator specified communication protocols. For translation of scan results, the scanning facilitation engine 160 may translate different scan results received in an operator specified communication format into a standardized communication format. The scanning facilitation engine 160 may distribute the translated scan results in the standardized communication format back to the user device 112.

The image certification engine 170 is executed for certifying various target resources that may be deployed or implemented within the computing environment 120, or other distributed computing environments. The certification process may start with security testing (e.g., SAST, DAST, SCA, etc.) a target resource (e.g., machine image, container image, or associated infrastructure components, etc.) for detection of vulnerabilities and/or compliance violations. To initiate the security testing, the image certification engine 170 may route associated scan requests to the scanning operators 190 and receive scan results once the scans are completed. After receiving the scan results from the scanning operators 190, the image certification engine 170 may perform various operations or execute various algorithms to evaluate the scan results. Based on the evaluation, the image certification engine 170 may generate a certification result.

The evaluation of the scan results may involve assessment of various certification factors, such as satisfaction of various security standards (e.g., vulnerability and code analysis), compliance standards, performance and scalability standards, and compatibility standards, which may be predetermined. The assessment of the above-mentioned various factors is discussed in greater detail with respect to the later figures below.

The user device 112 is representative of a plurality of user devices that may be coupled to the network 150. The user device 112 may include, for example, a processor-based system such as a computer system. Such a computer system may be embodied in the form of a desktop computer, a laptop computer, personal digital assistants, cellular telephones, smartphones, tablet computer systems, or other devices. The user device 112 may include a display 114. The display may include, for example, one or more devices such as liquid crystal display (LCD) displays, gas plasma-based flat panel displays, organic light emitting diode (OLED) displays, electrophoretic ink (E ink) displays, or other types of display devices, etc.

The user device 112 may be configured to execute various applications such as a user application 113 and/or other applications. The user application 113 may be executed in the user device 112, for example, to access network content served up by the computing environment 120 and/or other servers, thereby rendering a user interface 115 on the display 114 of the user device 112. To this end, the user application 113 may include, for example, a browser, a dedicated application, etc., and the user interface 115 may include a network page, an application screen, etc. The user device 112 may be configured to execute applications beyond the user application 113 such as, for example, email applications, social networking applications, word processors, spreadsheets, and/or other applications.

The user device 112 may display a user interface (UI) 115 enabling user the user device 112 to transmit scan and/or certification requests (e.g., vulnerability and/or compliance scan requests) to the computing environment 120 and receive scan and/or certification results from the computing environment 120, using one or more application programming interfaces (APIs) via the API 122. For example, the user device 112 may make API requests using one or more API protocols, such as REST, SOAP, GraphQL, etc. to communicate with the computing environment 120, including the scanning facilitation engine 160 and/or the image certification engine 170. The user device 112 may make API requests to transmit scan requests and receive scan results to and from the scanning facilitation engine 160 and/or the image certification engine 170. The user device 112 may make API requests to transmit certification requests and receive certification results to and from the scanning facilitation engine 160 and/or the image certification engine 170.

In some embodiments, the user interface 115 may be a graphical user interface (GUI) of a webpage or web application wherein the webpage or web application may be executed in a web browser application of the user device 112. In additional applications, the user interface 115 may be part of a native application executed, or otherwise presented, on the user device 112.

Figure 2:
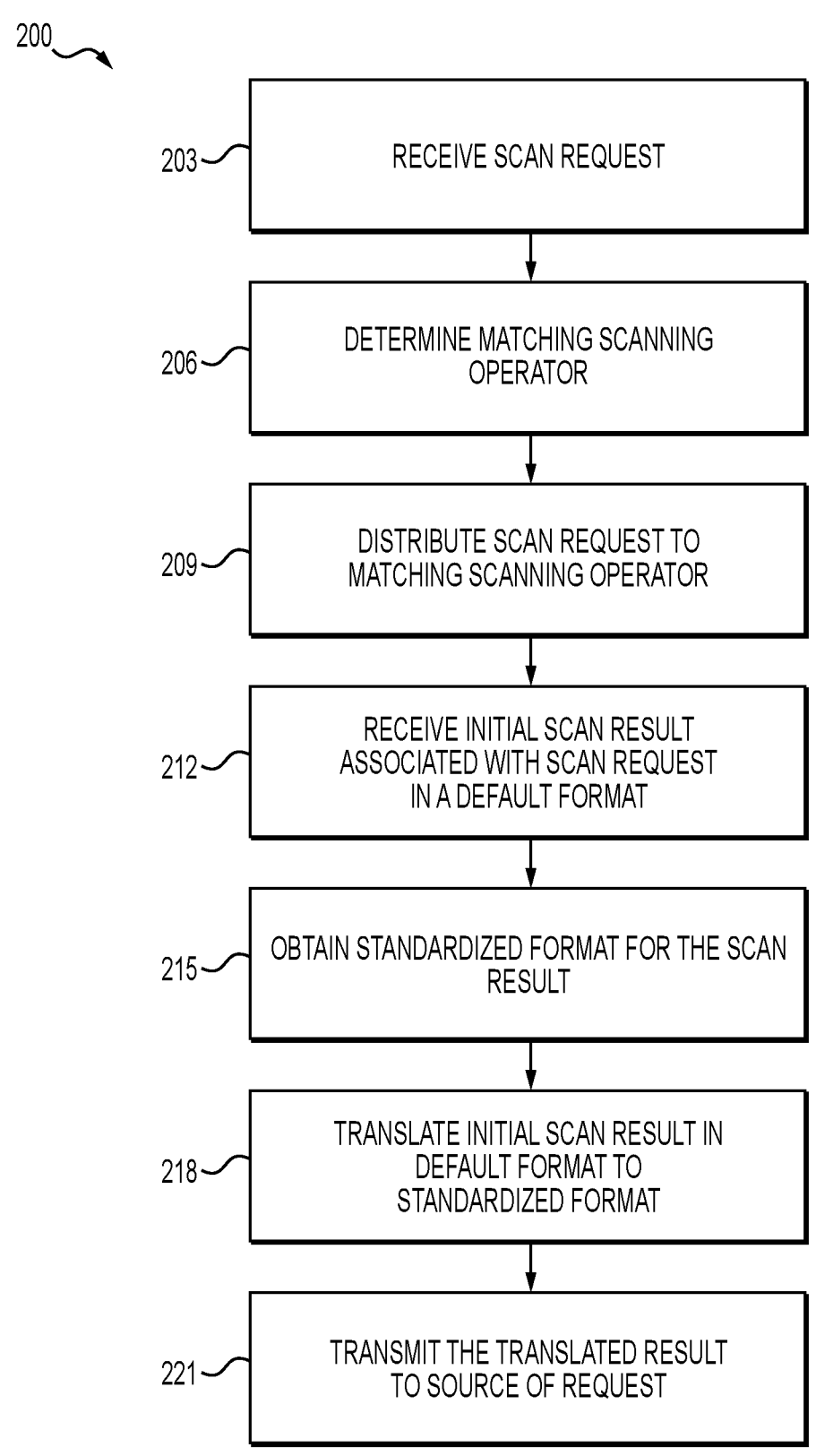
FIG. 2 depicts an exemplary method for distribution of scan requests, translation of scan results, and distribution of translated scan results, according to one or more embodiments.

Referring next to FIG. 2, shown is an exemplary method 200 for distribution of scan requests, translation of scan results, and distribution of translated scan results, according to one or more embodiments. The method 200 may correspond to examples of functionality implemented as portions of the scanning facilitation engine 160, executed in the computing environment of FIG. 1.

Starting with step 203, the scanning facilitation engine 160 may receive one or more scan requests associated with security testing of various applications, machine images, and/or container images. Scan requests may include one or more of vulnerability scan requests and/or compliance scan requests initiated by a user of the user device 112 via the API 122. For example, scan requests may include requests for SAST for detection of vulnerabilities by reviewing the source code of an application, DAST for detection of vulnerabilities present in the application and infrastructure when an application is running, SCA for detection of vulnerabilities focusing on third parties and open source vulnerabilities, or infrastructure and image scans for detection of vulnerabilities and compliance violations in machine images and containers images, among others.

Upon receiving a scan request via the API 122, the scanning facilitation engine 160 may have access to data objects associated with a target resource submitted for scanning. For example, if the target resource includes one or more applications or application components submitted for vulnerability scanning, the scanning facilitation engine 160 may have access to a code base of the application, an executable file of the application, and/or infrastructure components associated with the application. If the target resource includes one or more machine images or container images submitted for scanning, the scanning facilitation engine 160 may have access to the above-mentioned images, designated storage locations of the above-mentioned images, and/or infrastructure components associated with the above-mentioned images.

An application submitted as a target resource to be scanned may be an application that is deployable or executable via the network 150. For example, the application may be a cloud-based application executable in the network 150. A machine image or container image submitted as a target resource to be scanned may be an image that is deployable or executable via the network 150. Machine images or container images may correspond to images that a user of the user device 112 desires to release into production via the network 150. Machine images may include one or more of, for example, an Amazon® Machine Image (AMI), a Google Cloud Platform (GCP) VM image, a Microsoft Hyper-V Virtual Hard Disk (VHD) image, or a VirtualBox Virtual Machine Image (VMDK). Container images may include one or more of, for example, a Docker® image, a Containerd image, a Google® Container Registry (GCR) image, or an Azure® Container Registry (ACR) image.

At step 206, the scanning facilitation engine 160 may determine one or more matching scanning operators of the scanning operators 190 that are suitable for performing scans associated with the one or more scan requests. The scanning facilitation engine 160 may automatically determine the one or more matching scanning operators based on the type of scan request that is received. One or more matching scanning operators may be determined based on a resource type and the scan types required for that resource type.

For example, if a target resource submitted for scanning is an infrastructure component (e.g., a load balancer), an infrastructure scanner may be selected as the matching scanning operator by the scanning facilitation engine 160. If a target resource submitted for scanning is a source code repository (e.g., GitRepo), which would correspond to a software component or resource, a scanning operator that could perform SAST and/or SCA may be selected as a matching scanning operator based on requirements or properties of the source code repository and the scanning operator.

To further illustrate, if the scan request received at step 203 corresponds to a scan request for a target resource associated with a machine image or container image, the scanning facilitation engine 160 may automatically determine one or more specific scanning operators of the scanning operators 190 that are capable of performing security testing for machine images based on known characteristics of the scanning operators 190. Similarly, if the scan request received at step 203 corresponds to a scan request for a target resource associated with an application, the scanning facilitation engine 160 may automatically determine one or more specific operators of the scanning operators 190 that are capable of performing security testing for applications based on the known characteristics of the scanning operators 190. In some cases, the one or more matching scanning operators may be determined based on user preference, specified by the user device 112.

At step 209, the one or more received scan requests may be distributed to the one or more matching scanning operators determined at step 206. As mentioned, each matching scanning operator of the one or more matching scanning operators may require that scan requests be transmitted via an operator specified communication protocol. For example, a matching scanning operator of the one or more matching scanning operators may require that scan requests be submitted via an operator specified API. Upon determining the one or more matching scanning operators, the scanning facilitation engine 160 may determine a respective operator specified communication protocol required for each matching scanning operator. The scanning facilitation engine 160 may translate each of the one or more scan requests to be compatible with a respective operator specified communication protocol for each matching scanning operator. In some cases where a matching scanning operator does not provide an exposed API, the scanning facilitation engine 160 may generate an email or use other forms of communication to transmit one or more scan requests. Thereafter, the scanning facilitation engine 160 may automatically route each received scan request to one or more matching scanning operators using respective operator specified communication protocols, as described above.

At step 212, the scanning facilitation engine 160 may receive one or more initial scan results once corresponding scans are completed by the one or more matching scanning operators. These initial scan results may include one or more data objects stored in a default data format (e.g., JSON, XML, CSV, etc.) predetermined by each matching scanning operator. An initial scan result may include a report indicating a pass or a fail of the security test that was performed. An initial scan result may also include various bits of information about the scan that was performed including one or more of: the time when the scan was initiated, number and types of vulnerabilities detected, severity of the vulnerabilities detected, the time the scan was completed, or mitigation recommendations based on the vulnerabilities detected, among others. In the case of a fail result, the text may include reasons for a fail result.

At step 215, the scanning facilitation engine 160 may obtain a standardized data format for translating or converting received scan results. The standardized data format, or "standardized format" in short, may be predetermined by the user device 112 and may include one or more of the data formats discussed previously. For example, a standardized format may include one or more of: JSON, XML, CSV, TXT, HTML, among other data formats. As mentioned, translating scan results into a standardized format may be desired and beneficial after receiving scan results in various different data formats predetermined by the one or more matching scanning operators. The scanning facilitation engine 160 may obtain a standardized format from the user device 112 via the API 122. In some cases, the scanning facilitation engine 160 may be programmed to use a specific standardized data format. A preferred standardized data format used by the scanning facilitation engine 160 may be JSON, as this format may provide numerous benefits such as being the industry standard for API responses. JSON format may also be sent as a text string that can be translated into an object. This format may also provide for numerous serialization opportunities. In some cases, the scanning facilitation engine 160 may obtain or be programmed to use two or more standardized formats, depending on the characteristics or number of resources submitted for security testing, user preferences, etc.

At step 218, the scanning facilitation engine 160 may translate or convert the one or more initial scan results obtained at step 212 into a standardized format (e.g., JSON, CSV, etc.) obtained at step 215. Translating the one or more initial scan results into a standardized format may include, for example, the scanning facilitation engine 160 automatically converting the one or more initial scan results in an operator predetermined default data format into a standardized data format. If the scanning facilitation engine 160 receives a plurality of scan results from the one or more matching scanning operators 190 in different default data formats, the scanning facilitation engine 160 may automatically translate each scan result into a standardized format. In some cases, the scanning facilitation engine 160 may translate the one or more scan results into two or more standardized formats, depending on the types or number of resources submitted for scanning, user preferences, etc.

At step 221, the scanning facilitation engine 160 may transmit the one or more translated results to a source of the scan request (e.g., the user device 112). The scanning facilitation engine 160 may transmit the one or more translated results to the user device 112 via the API 122 as a component of a serverless compute in the computing environment 120. The scanning facilitation engine 160 may store the one or more translated results and/or the one or more initial results obtained at step 212 in the data store 130 for future access or retrieval. In some cases, the scanning facilitation engine 160 may transmit the one or more translated results to the user device 112 upon receiving a request from the user device 112.

At any instance of time after receiving the one or more scan requests (i.e., after step 203), the scanning facilitation engine 160 may receive a query from the user device 112 requesting for a status or progress update of a transmitted scan request. Upon receiving the query, the scanning facilitation engine 160 may ping the one or more matching scanning operators to obtain a status of the transmitted scan request. For example, available status updates may include messages sent by the one or more matching scanning operators including various bits of information about the transmitted scan request, such as one or more of: when the scan was initiated, an estimated time until completion of the transmitted scan request, current vulnerabilities and/or compliance violations detected, number of violations currently determined, severity of the vulnerabilities detected, summary of current findings, etc. Available status updates for a transmitted scan request may vary based on the matching scanning operator performing the scan. After obtaining available status updates from the one or more matching scanning operators, the scanning facilitation engine 160 may transmit the obtained status updates to the user device 112.

Figure 3:
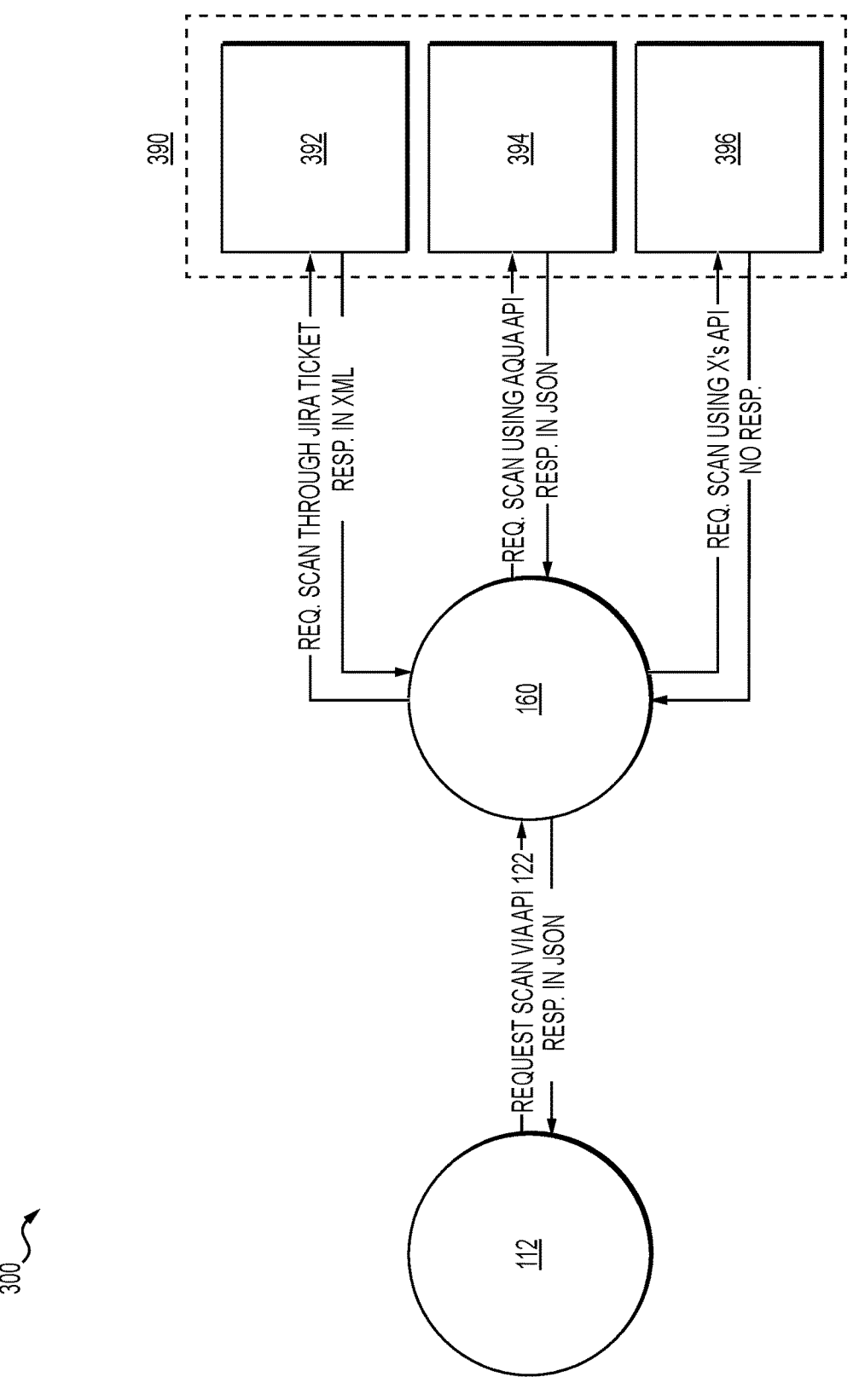
FIG. 3 is an exemplary diagram depicting flow of data between a scanning facilitation engine, a user, and one or more scanning operators, according to one or more embodiments.

FIG. 3 is an exemplary diagram depicting flow of data between a scanning facilitation engine, a user, and one or more scanning operators, according to one or more embodiments. For example, diagram 300 illustrates reciprocal data flow between the user device 112, the scanning facilitation engine 160, and matching scanning operators 390 for security testing of an application, a machine image, or a container image. The reciprocal data flow may be initiated when the scanning facilitation engine 160 receives one or more scan requests from the user device 112 via an API provided by the scanning facilitation engine 160, such as the API 122. Upon receiving the one or more scan requests, the scanning facilitation engine 160 may route the one or more scan requests to the matching scanning operators 390.

The matching scanning operators 390 may include one or more of the scanning operators 190 and may be determined in a way similar to the step 206 of the method 200 (FIG. 2). The matching scanning operators 390 may include first scanning operator 392, second scanning operator 394, and third scanning operator 396, all of which may be capable of performing various security scans requested by the user device 112. Although three operators are illustrated in FIG. 3, the matching scanning operators 390 are not limited thereto. The matching scanning operators 390 may include greater or less than three operators depending on number of matching scanning operators determined by the scanning facilitation engine 160, for example. Further, the reciprocal data flow depicted in the diagram 300 is provided as an example only, and other types of data associated with security testing may flow between the user device 112, the scanning facilitation engine 160, and the matching scanning operators 390.

As explained in step 209 for the method 200, each of the matching scanning operators 390 may require that scan requests be transmitted via an operator specified communication protocol. Each of the matching scanning operators 390 may require use of different communication protocols. For example, the first scanning operator 392 may require that scan requests be submitted using the first scanning operator's API. The second scanning operator 394 may require that scan requests be submitted using the second scanning operator's API. The third scanning operator 396 may require that scan requests be submitted using the third scanning operator's API.

Upon receiving the one or more scan requests and determining the different communication protocols required for submitting scan requests for the matching scanning operators 390, the scanning facilitation engine 160 may automatically route each scan request to a matching scanning operator using the communication protocol required by the matching scanning operator. For example, the scanning facilitation engine 160 may transmit a scan request to the first scanning operator 392 using the first scanning operator's API, transmit a scan request to the second scanning operator 394 using the second scanning operator's API, and transmit a scan request to the third scanning operator 396 using the third scanning operator's API.

Upon completion of the scans by the matching scanning operators 390, the scanning facilitation engine 160 may be configured to receive initial scan results in a similar way as explained in step 212 of method 200 (FIG. 2). Each matching scanning operator of the matching scanning operators 390 may generate an initial scan result including one or more data objects stored in a default data format (e.g., JSON, XML, CSV, etc.) predetermined by each matching scanning operator. An initial scan result may include a report indicating a pass or a fail of the security test that was performed. An initial scan result may also include various bits of information about the scan that was performed including one or more of: the time when the scan was initiated, number and types of vulnerabilities detected, severity of the vulnerabilities detected, the time the scan was completed, or mitigation recommendations based on the vulnerabilities detected, among others. In the case of a fail result, the text may include reasons for a fail result.

The scanning facilitation engine 160 may receive initial scan results from each of the matching scanning operators 390 in different default data formats. For example, the scanning facilitation engine 160 may receive a first initial scan result from the first scanning operator 392 in XML format. The scanning facilitation engine 160 may receive a second initial scan result from the second scanning operator 394 in JSON format. However, the scanning facilitation engine 160 may not receive an initial scan result from the third scanning operator 394.

After receiving the initial scan results, the scanning facilitation engine 160 may be configured to translate each of the initial scan results in a default data format into a standardized data format. As described with respect to steps 215 and 218 for method 200 (FIG. 2), the standardized data format may be predetermined by the user device 112 and may include one or more of: JSON, XML, CSV, TXT, HTML, among other data formats. In some cases, the scanning facilitation engine 160 may be programmed to use a specific standardized data format. Translating the initial scan results into a standardized format may include, for example, the scanning facilitation engine 160 automatically converting the one or more initial scan results in an operator predetermined default data format into a standardized data format. As such, the first initial scan result received in XML format may be converted to a standardized format (e.g., JSON). The second initial scan result received in JSON format may not need to be converted. Thereafter, the first initial scan result and the second initial scan result, both in JSON format, may be transmitted to the user device 112.

Figure 4:
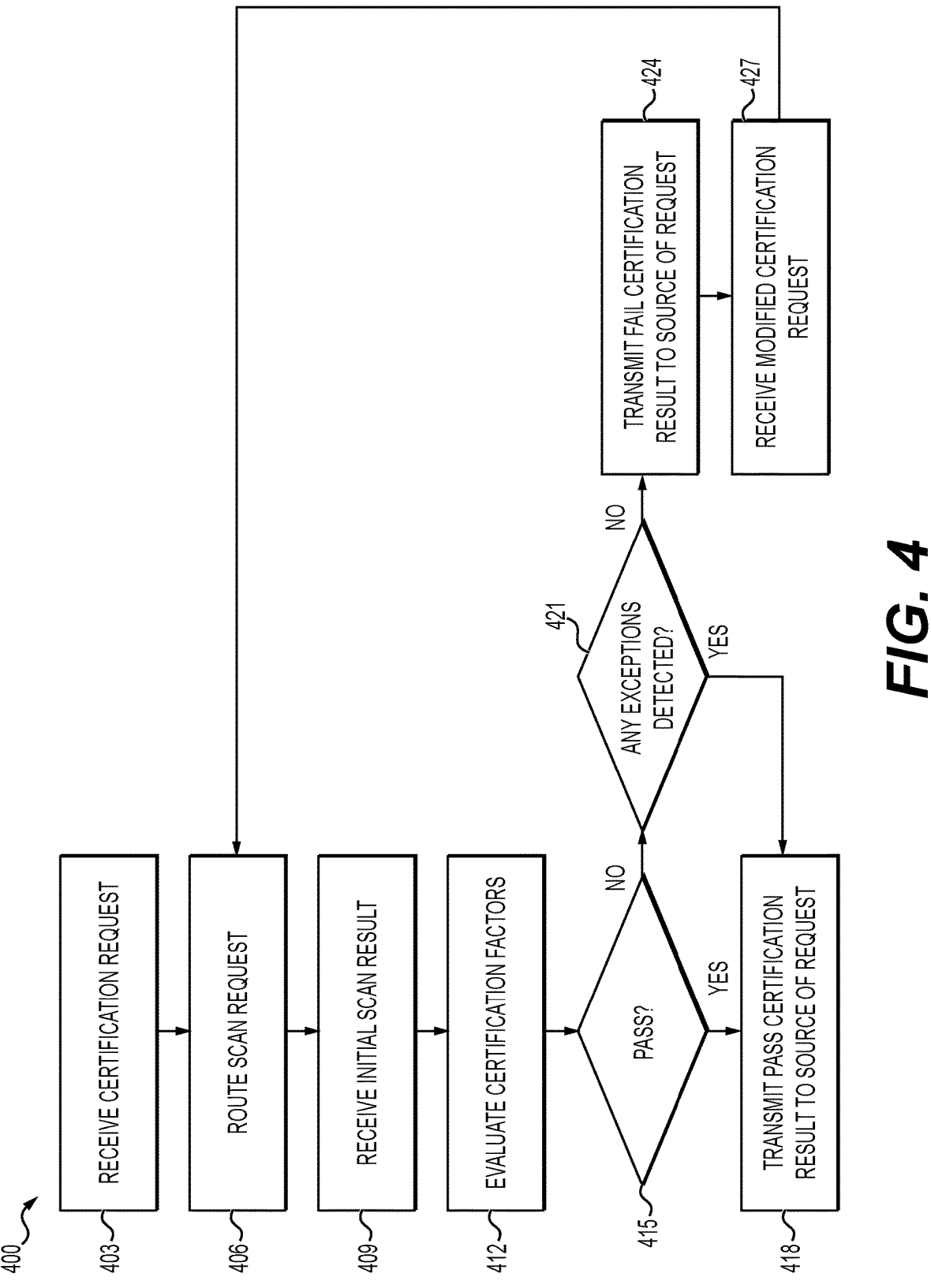
FIG. 4 depicts an exemplary method for certifying machine and/or container images, according to one or more embodiments.

FIG. 4 depicts an exemplary method 400 for certifying machine and/or container images, according to one or more embodiments. The method 400 may correspond to examples of functionality implemented as portions of the image certification engine 170, executed in the computing environment of FIG. 1.

Starting with step 403, the image certification engine 170 may receive one or more certification requests of various target resources that may be deployed or implemented within the computing environment 120, or other distributed computing environments. The certification process may start with security testing (e.g., SAST, DAST, SCA, etc.) a target resource (e.g., machine image, container image, or associated infrastructure components, etc.) for detection of vulnerabilities and/or compliance violations. As such, a certification request may automatically include a scan request for the detection of the above-mentioned vulnerabilities and/or compliance violations. Certification requests may be initiated by the user device 112 via the API 122.

At step 406, the image certification engine 170 may route a scan request associated with a certification request to the scanning operators 190. The image certification engine 170 may be configured to operate similarly to the scanning facilitation engine 160 in routing scan requests to the scanning operators 190. For example, the image certification engine 170 may perform some of the operations described at steps 206 and 209 of the method 200 in distributing scan requests to the scanning operators 190. Similar to the scanning facilitation engine 160, the image certification engine 170 may automatically determine one or more matching scanning operators of the scanning operators 190 based on the type of scan request that is received. For example, if a scan request received with a certification request corresponds to a scan request for a target resource associated with a machine image or container image, the scanning facilitation engine 160 may automatically determine one or more specific scanning operators of the scanning operators 190 that are capable of performing security testing for machine and/or container images based on known characteristics of the scanning operators 190.

After determining one or more matching scanning operators, the image certification engine 170 may distribute one or more scan requests to the one or more matching scanning operators in a way similar to that of the scanning facilitation engine 160. As mentioned, each matching scanning operator of the one or more matching scanning operators may require that scan requests be transmitted via an operator specified communication protocol. For example, a matching scanning operator of the one or more matching scanning operators may require that scan requests be submitted via an operator specified API. Upon determining the one or more matching scanning operators, the image certification engine 170 may determine an operator specified communication protocol required for each matching scanning operator. Thereafter, the image certification engine 170 may automatically route each received scan request to a matching scanning operator using the appropriate communication protocol.

In some cases, the image certification engine 170 may route one or more scan requests to the scanning operators 190 via the scanning facilitation engine 160. For example, the image certification engine 170 may not be in direct communication with the scanning operators 190. Instead, the image certification engine 170 may transmit one or more scan requests to the scanning facilitation engine 160, and the scanning facilitation engine 160 may distribute the one or more scan requests to the scanning operators 190. Depending on the number and type (e.g., container image scan request, machine image scan request, infrastructure scan request, etc.) of scan request received and/or depending on the data contained in a target resource to be scanned, the image certification engine 170 may transmit some scan requests directly to the matching one or more scanning operators and/or transmit some scan requests via the scanning facilitation engine 160.

At step 409, the image certification engine 170 may receive one or more initial scan results once corresponding scans are completed by the one or more matching scanning operators. These initial scan results may include one or more data objects stored in a default data format (e.g., JSON, XML, CSV, etc.) predetermined by each matching scanning operator. An initial scan result may include a report indicating a pass or a fail of the security or compliance test that was performed. An initial scan result may also include various bits of information about the scan that was performed including one or more of: the time when the scan was initiated, number and types of vulnerabilities detected, severity of the vulnerabilities detected, the time the scan was completed, or mitigation recommendations based on the vulnerabilities detected, among others. In the case of a fail result, the text may include reasons for a fail result.

In some cases, the image certification engine 170 may receive the one or more initial scan results from the matching scanning operators via the scanning facilitation engine 160. For example, if scan requests were distributed to the one or more matching scanning operators via the scanning facilitation engine 160, the scanning facilitation engine 160 may be configured to receive the initial scan results distribute the initial scan results to the image certification engine 170. Depending on the number and type (e.g., container image scan request, machine image scan request, infrastructure scan request, etc.) of scan request received and/or depending on the data contained in a target resource that was scanned, the image certification engine 170 may receive some initial scan results directly from the matching one or more scanning operators and/or receive some scan results via the scanning facilitation engine 160.

At step 412, the image certification engine 170 may be configured to evaluate the initial scan results based on performance of various operations and/or algorithms. The evaluation of the initial scan results may include determining the validity of the initial scan results. Determining the validity may involve assessment of various certification factors, such as satisfaction of various security standards (e.g., vulnerability and code analysis), satisfaction of various compliance standards, satisfaction of various performance and scalability standards, and satisfaction of various compatibility standards. These certification factors may be predetermined and based on internal procedures implemented for the computing environment 120 and the user device 112. Some of these certification factors may be associated with the factors evaluated during the scans performed by the one or more matching scanning operators for detection of any vulnerabilities or compliance violations.

Determining the validity of an initial scan result may also include scanning the initial scan result for accuracy and any errors. For example, a scan performed by a matching scanning operator may have been performed with incorrect configurations or settings. If an initial scan result is scanned by the image certification engine 170 to include unwanted errors, such as being performed with incorrect configurations or settings, the initial scan result may be invalidated.

At step 415, the image certification engine 170 may generate a pass certification result based on the evaluation process described in step 412. A pass certification result may be generated if the evaluation of the certification results validates the initial scan results. For example, if an initial scan result transmitted by a matching scanning operator does not detect any vulnerabilities or compliance violations, and if evaluation of the certification factors validates the initial scan result, a pass certification result may be generated. Conversely, if an initial scan result transmitted by a matching scanning operator detects any vulnerabilities or compliance violations, and if evaluation of the certification factors validates the initial scan result, a pass certification result may not be generated. If a pass certification result is generated, the method 400 moves to step 418. If a pass certification result is not generated, the method 400 moves to step 421.

At step 418, the image certification engine 170 may transmit one or more pass certification results to a source of the scan request (e.g., the user device 112). The image certification engine 170 may transmit the one or more pass certification results to the user device 112 via the API 122 as a component of a serverless compute in the computing environment 120. The image certification engine 170 may store the one or more pass certification results and/or the one or more initial results obtained at step 409 in the data store 130 for future access or retrieval. In some cases, the image certification engine 170 may transmit the one or more pass certification results to the user device 112 upon receiving a request from the user device 112.

At step 421, the image certification engine 170 may be configured to search and detect any available exceptions in response to a pass certification result not being generated. For example, although an initial scan result indicates detection of a vulnerability or a compliance violation, the image certification engine 170 may be configured to search the data store 130 for the presence of any exceptions to the detected vulnerability or compliance violation. For example, an exception may include an age duration threshold of a detected vulnerability or compliance violation, such as if a detected vulnerability has existed for less than a certain time period, the detected vulnerability may be excluded from being considered as part of the certification process. Other exceptions may include certain policy exceptions, security standard exceptions, compliance standard exceptions, which may be predetermined and programmed for the image certification engine 170 by the user device 112. If an exception is detected for a detected vulnerability associated with a scan request, a pass certification result may be generated, and the method 400 may move to step 418. If an exception is not detected for a detected vulnerability associated with a scan request, a fail certification result may be generated, and the method 400 may move to step 424.

At step 424, the image certification engine 170 may transmit one or more fail certification results to a source of the scan request (e.g., the user device 112). The image certification engine 170 may transmit the one or more fail certification results to the user device 112 via the API 122 as a component of a serverless compute in the computing environment 120. The image certification engine 170 may store the one or more fail certification results and/or the one or more initial results obtained at step 409 in the data store 130 for future access or retrieval. In some cases, the image certification engine 170 may transmit the one or more fail certification results to the user device 112 upon receiving a request from the user device 112.

At step 427, the image certification engine 170 may receive a modified certification request from the user device 112. The modified certification request, which may be a second certification request, may be associated with the certification request submitted at step 403 but with modifications to remedy the fail certification result. For example, the modified certification request may include the same target resource submitted for certification as was submitted at step 403, but with modifications to remedy any detected vulnerability or compliance violation that may have caused the fail certification result. Upon receiving the modified certification request, the method 400 may move back to step 406, where the image certification engine 170 may be configured to route a scan request for the modified certification request to one or more matching scanning operators and so on.

At any instance of time after receiving the one or more certification requests (i.e., after step 403), the image certification engine 170 may receive a query from the user device 112 requesting for a status or progress update of a transmitted certification request. Upon receiving the query, the image certification engine 170 may ping the one or more matching scanning operators to obtain a status of the transmitted scan request. For example, available status updates may include messages sent by the one or more matching scanning operators including various bits of information about the transmitted scan request, such as one or more of:

when the scan was initiated, an estimated time until completion of the transmitted scan request, current vulnerabilities and/or compliance violations detected, number of violations currently determined, severity of the vulnerabilities detected, summary of current findings, etc. The image certification engine 170 may further provide the user device 112 updates regarding any portion of the certification process, such as which component of the certification factors were and were not met, if initial scan results were validated or not validated, etc.

Figure 5:
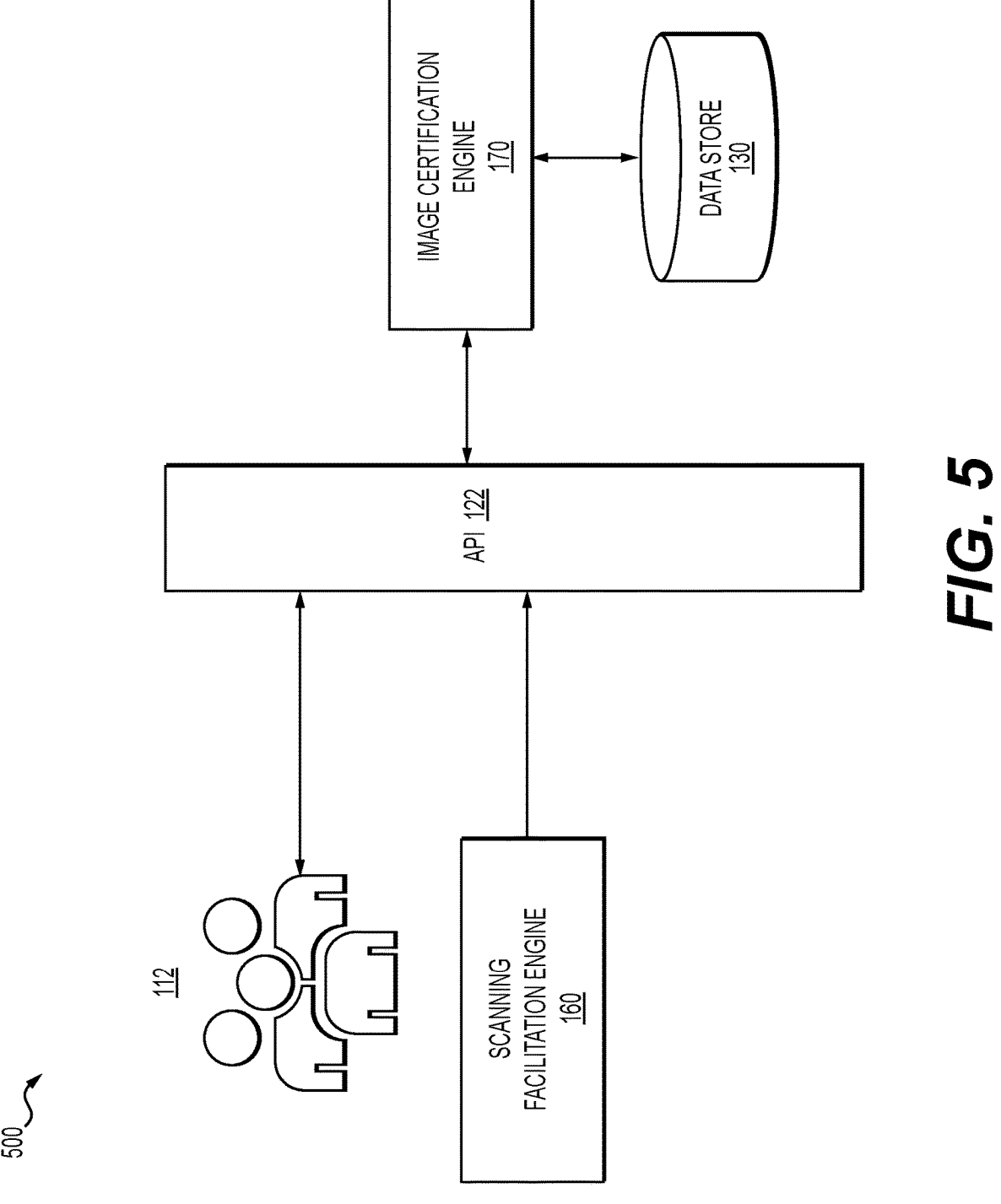
FIG. 5 is an exemplary diagram depicting flow of data between an image certification engine, a user, and a scanning facilitation engine, according to one or more embodiments.

FIG. 5 is an exemplary diagram depicting flow of data between an image certification engine, a user, and a scanning facilitation engine, according to one or more embodiments. For example, diagram 500 illustrates reciprocal data flow between the user device 112, the scanning facilitation engine 160, and the image certification engine 170 for certifying machine and/or container images. The reciprocal data flow may be initiated when the image certification engine 170 receives one or more certification requests from the user device 112 via the API 122. Upon receiving the one or more certification requests, the image certification engine 170 may be configured to perform the operations discussed with respect to the method 400 for FIG. 4. For example, the image certification engine 170 may be configured to distribute scan requests associated with the certification requests to one or more of the scanning operators 190 (FIG. 1).

The image certification engine 170 may be communicatively coupled to the scanning facilitation engine 160 and the user device 112 via the API 122. As mentioned with respect to the method 400 (FIG. 4), the image certification engine 170 may distribute scan requests to and receive initial scan results from the scanning operators 190 directly or via the scanning facilitation engine 160. To this end, the scanning facilitation engine 160 may be configured to process distribution of scan requests and initial scan results, and the image certification engine 170 may be configured to determine certification of one or more target resources (e.g., machine image, container image, or related infrastructure components) submitted for certification.

Figure 6:
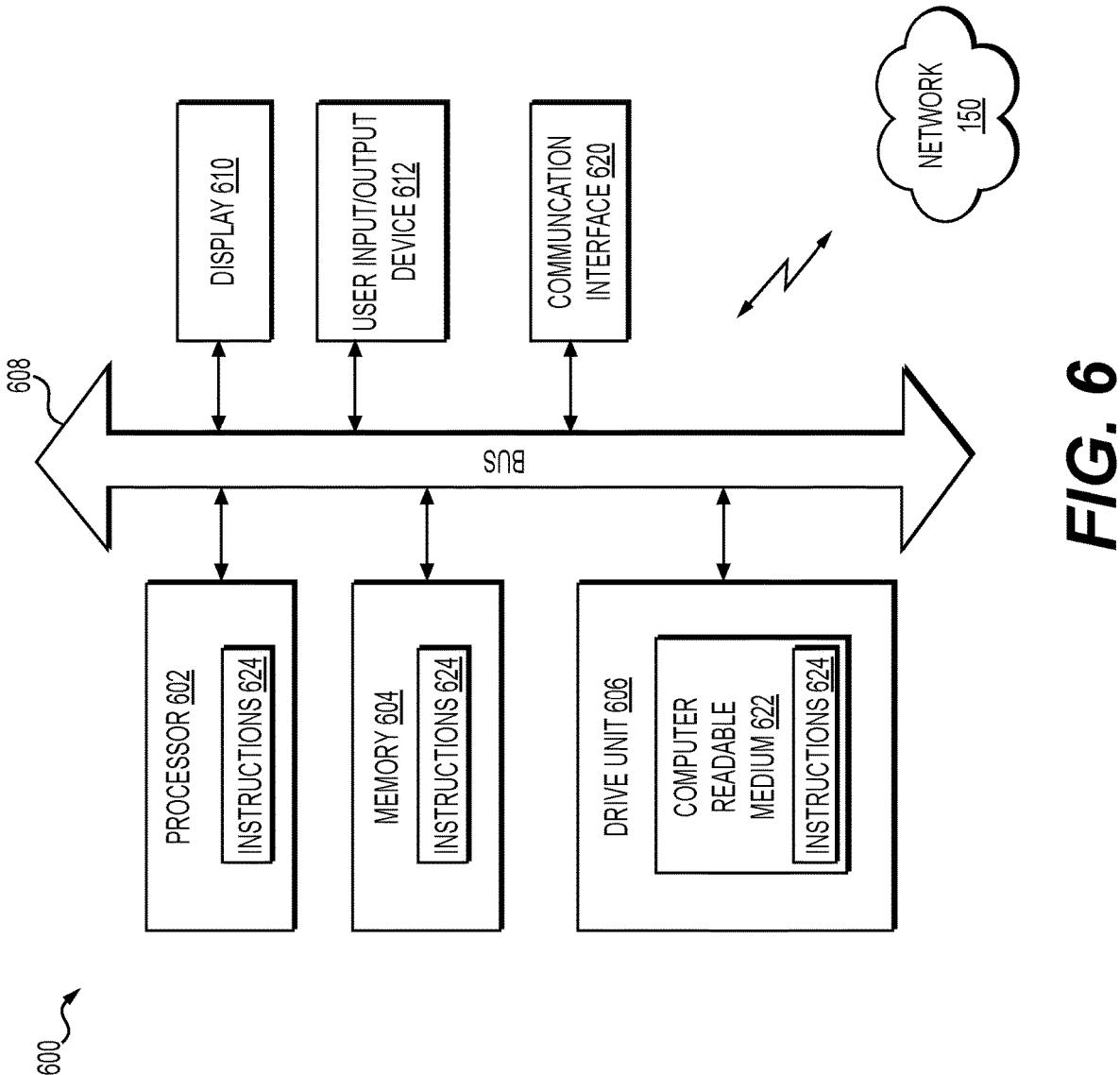
FIG. 6 depicts an exemplary implementation of a computer system that executes techniques presented herein, according to one or more embodiments.

FIG. 6 depicts an exemplary implementation of a computer system that executes techniques presented herein, according to one or more embodiments. The computer system 600 includes a set of instructions that are executed to cause the computer system 600 to perform any one or more of the methods or computer based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 is implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 is a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (i.e., programmed).

The computer system 600 includes a memory 604 that communicates via bus 608. The memory 604 is a main memory, a static memory, or a dynamic memory. The memory 604 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein are performed by the processor 602 executing the instructions stored in the memory 604. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 600 further includes a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in the drive unit 606.

Additionally or alternatively, the computer system 600 includes an input/output device 612 configured to allow a user to interact with any of the components of the computer system 600. The input/output device 612 is a number pad, a keyboard, a cursor control device, such as a mouse, a joystick, touch screen display, remote control, or any other device operative to interact with the computer system 600.

The computer system 600 also includes the drive unit 606 implemented as a disk or optical drive. The drive unit 606 includes a computer-readable medium 622 in which one or more sets of instructions 624, e.g. software, is embedded. Further, the sets of instructions 624 embodies one or more of the methods or logic as described herein. The sets of instructions 624 resides completely or partially within the memory 604 and/or within the processor 602 during execution by the computer system 600. The memory 604 and the processor 602 also include computer-readable media as discussed above.

In some systems, computer-readable medium 622 includes the set of instructions 624 or receives and executes the set of instructions 624 responsive to a propagated signal so that a device connected to network 150 communicates voice, video, audio, images, or any other data over the network 150. Further, the sets of instructions 624 are transmitted or received over the network 150 via the communication port or interface 620, and/or using the bus 608. The communication port or interface 620 is a part of the processor 602 or is a separate component. The communication port or interface 620 is created in software or is a physical connection in hardware. The communication port or interface 620 is configured to connect with the network 150, external media, the display 610, or any other components in the computer system 600, or combinations thereof. The connection with the network 150 is a physical connection, such as a wired Ethernet connection, or is established wirelessly as discussed below. Likewise, the additional connections with other components of the computer system 600 are physical connections or are established wirelessly. The network 150 alternatively be directly connected to the bus 608.

While the computer-readable medium 622 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 622 is non-transitory, and may be tangible.

The computer-readable medium 622 includes a solid-state memory such as a memory card or other package that houses one or more non-volatile read-only memories. The computer-readable medium 622 is a random-access memory or other volatile re-writable memory. Additionally or alternatively, the computer-readable medium 622 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 600 is connected to the network 150. The network 150 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. The network 150 includes wide area networks (WAN), such as the Internet, local area networks (LAN), campus area networks, metropolitan area networks, a direct connection such as through a Universal Serial Bus (USB) port, or any other networks that allows for data communication. The network 150 is configured to couple one computing device to another computing device to enable communication of data between the devices. The network 150 is generally enabled to employ any form of machine-readable media for communicating information from one device to another. The network 150 includes communication methods by which information travels between computing devices. The network 150 is divided into sub-networks. The sub-networks allow access to all of the other components connected thereto or the sub-networks restrict access between the components. The network 150 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, comprising:

receiving, via one or more processors, a request to scan a resource for detection of a vulnerability, the resource comprising one or more of:

a component of an application, a code-base of the application, a third-party library associated with the application, a machine image, a container image, or an infrastructure component associated with the machine image, the container image, or the application;

determining, via the one or more processors, one or more matching vulnerability scanning operators among a plurality of vulnerability scanning operators based at least in part on one or more properties associated with the request;

transmitting, via the one or more processors, the request to the one or more matching vulnerability scanning operators, the one or more matching vulnerability scanning operators having access to the resource;

receiving, via the one or more processors, an initial result associated with the request from the one or more matching vulnerability scanning operators, wherein the initial result comprises:

a first individual result from a first matching vulnerability scanning operator of the one or more matching vulnerability scanning operators; and a second individual result from a second matching vulnerability scanning operator of the one or more matching vulnerability scanning operators;

obtaining, via the one or more processors, a predetermined format for the initial result;

generating, via the one or more processors, a translated result by modifying the initial result based on the predetermined format, wherein the first individual result is in a first operator format and the second individual result is in a second operator format, the first operator format and the second operator format being different, such that the translated result standardizes the first individual result and the second individual result into the predetermined format; and transmitting, via the one or more processors, the translated result to a source of the request.

2. The computer-implemented method of claim 1, wherein the one or more properties comprise:

a selection of one or more of static application security testing (SAST), dynamic application security testing (DAST), software composition analysis (SCA), infrastructure scanning, application programming interface (API) scanning, infrastructure as code (IAC) scanning, or container scanning.

3. The computer-implemented method of claim 1, wherein the one or more processors are components of a virtual machine instance operating in a cloud computing environment.

4. The computer-implemented method of claim 1, further comprising, prior to transmitting the request to the one or more matching vulnerability scanning operators and after determining the one or more matching vulnerability scanning operators:

determining, via the one or more processors, a respective operator specified communication protocol for each of the one or more matching vulnerability scanning operators; and wherein transmitting the request to each of the one or more matching vulnerability scanning operators includes transmitting the request via the respective operator specified communication protocol.

5. The computer-implemented method of claim 1, wherein transmitting the translated result to the source of the request comprises:

using an application programming interface (API) as a component of a serverless compute in a cloud computing environment.

6. The computer-implemented method of claim 5, wherein the API comprises:

a representational state transfer (REST) API.

7. The computer-implemented method of claim 1, wherein the predetermined format comprises one or more of: a JSON format, a CSV format, or a XML format.

8. The computer-implemented method of claim 1, wherein the initial result and the translated result are stored in a serverless data store in a cloud computing environment.

9. The computer-implemented method of claim 1, further comprising:

receiving, via the one or more processors, a query for a status update of the request from the source of the request; and transmitting, via the one or more processors, a response to the query to the source of the request.

10. A non-transitory computer-readable medium containing instructions that, when executed by a processor, cause the processor to perform a method comprising:

receiving a request to scan a resource for detection of a vulnerability, the resource comprising one or more of:

a component of an application, a code-base of the application, or a third-party library associated with the application;

determining one or more matching vulnerability scanning operators among a plurality of vulnerability scanning operators based at least in part on one or more properties associated with the request;

transmitting the request to the one or more matching vulnerability scanning operators, the one or more matching vulnerability scanning operators having access to the resource;

receiving an initial result associated with the request from the one or more matching vulnerability scanning operators, wherein the initial result comprises:

a first individual result from a first matching vulnerability scanning operator of the one or more matching vulnerability scanning operators; and a second individual result from a second matching vulnerability scanning operator of the one or more matching vulnerability scanning operators;

obtaining a predetermined format for the initial result;

generating a translated result by modifying the initial result based on the predetermined format, wherein the first individual result is in a first operator format and the second individual result is in a second operator format, the first operator format and the second operator format being different, such that the translated result standardizes the first individual result and the second individual result into the predetermined format; and transmitting the translated result to a source of the request.

11. The non-transitory computer-readable medium of claim 10, wherein the one or more properties comprise:

a selection of one or more of static application security testing (SAST), dynamic application security testing (DAST), software composition analysis (SCA), infrastructure scanning, application programming interface (API) scanning, infrastructure as code (IAC) scanning, or container scanning.

12. The non-transitory computer-readable medium of claim 10, the method further comprising, prior to transmitting the request to the one or more matching vulnerability scanning operators and after determining the one or more matching vulnerability scanning operators:

determining a respective operator specified communication protocol for each of the one or more matching vulnerability scanning operators; and wherein transmitting the request to each of the one or more matching vulnerability scanning operators includes transmitting the request via the respective operator specified communication protocol.

13. The non-transitory computer-readable medium of claim 10, wherein transmitting the translated result to the source of the request comprises:

using an application programming interface (API) as a component of a serverless compute in a cloud computing environment.

14. The non-transitory computer-readable medium of claim 10, wherein the initial result and the translated result are stored in a serverless data store in a cloud computing environment.

15. The non-transitory computer-readable medium of claim 10, the method further comprising:

receiving a query for a status update of the request from the source of the request; and transmitting a response to the query to the source of the request.

16. A computer-implemented method, comprising:

receiving, via one or more processors, a request to scan a resource for detection of a vulnerability, the resource comprising one or more of:

a component of an application, a code-base of the application, or a third-party library associated with the application;

determining, via the one or more processors, one or more matching vulnerability scanning operators among a plurality of vulnerability scanning operators based at least in part on one or more properties associated with the request;

determining, via the one or more processors, a respective operator specified communication protocol for each of the one or more matching vulnerability scanning operators;

transmitting, via the one or more processors, the request to the one or more matching vulnerability scanning operators, the one or more matching vulnerability scanning operators having access to the resource, wherein transmitting the request to each of the one or more matching vulnerability scanning operators includes transmitting the request via the respective operator specified communication protocol;

receiving, via the one or more processors, an initial result associated with the request from the one or more matching vulnerability scanning operators, the initial result comprising:

a first individual result from a first matching vulnerability scanning operator of the one or more matching vulnerability scanning operators; and a second individual result from a second matching vulnerability scanning operator of the one or more matching vulnerability scanning operators, wherein the first individual result is in a first operator format and the second individual result is in a second operator format, the first operator format and the second operator format being different;

obtaining, via the one or more processors, a predetermined format for the initial result;

generating, via the one or more processors, a translated result by modifying the initial result based on the predetermined format, such that the translated result standardizes the first individual result and the second individual result into the predetermined format; and transmitting, via the one or more processors, the translated result to a source of the request.

\* \* \* \* \*